No. 711,050. Patented Oct. 14, 1902.
H. H. JENSEN.
GARDEN IMPLEMENT.
(Application filed Aug. 29, 1901.)
(No Model.)

Witnesses
Carrie F. Cooney.
John H. Reuer

Inventor
Hans Holden Jensen
By Benedict & Morsell
Attorneys.

UNITED STATES PATENT OFFICE.

HANS HOLDEN JENSEN, OF MILWAUKEE, WISCONSIN, ASSIGNOR OF ONE-HALF TO ANDREW KAAD, OF MILWAUKEE, WISCONSIN.

GARDEN IMPLEMENT.

SPECIFICATION forming part of Letters Patent No. 711,050, dated October 14, 1902.

Application filed August 29, 1901. Serial No. 73,658. (No model.)

*To all whom it may concern:*

Be it known that I, HANS HOLDEN JENSEN, of Milwaukee, Wisconsin, have invented a new and useful Improvement in Garden Implements, of which the following is a description, reference being had to the accompanying drawings, which are a part of this specification.

My invention is in an implement designed especially for use in gardens, and the novel features of the implement may be employed with a spade or hoe blade, a rake-head, a weed-knife, a cutting-hook, or other analogous garden-tool.

As the invention may be employed in a hoe, I have deemed it sufficient to illustrate it with a hoe-blade.

The invention consists of the devices, their parts, and combinations, as herein described and claimed, or the equivalents thereof.

Figure 1:
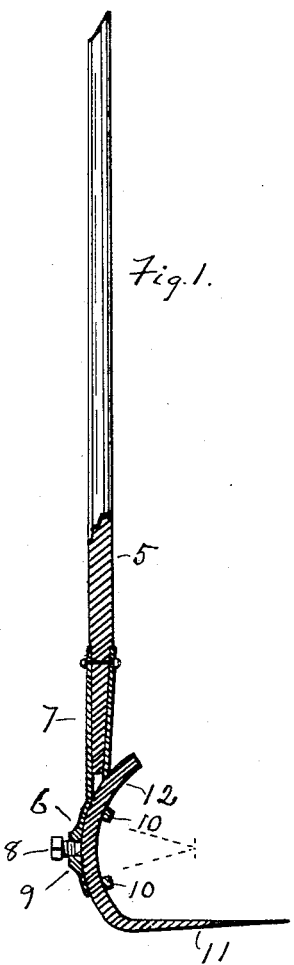
Figure 3:
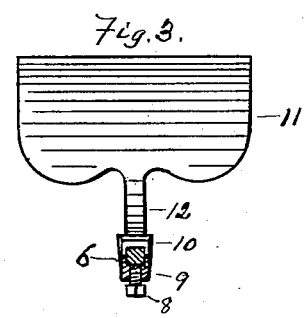
Figure 2:
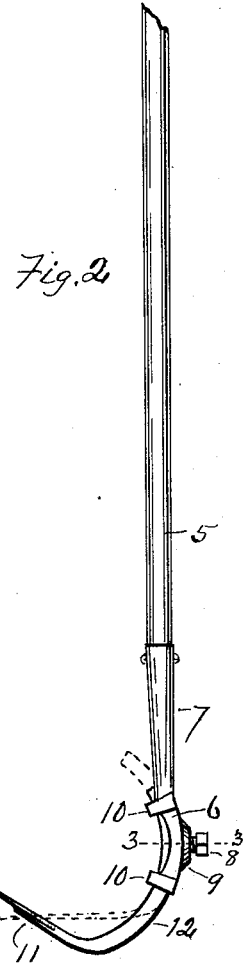

In the drawings, Figure 1 represents a fragment of the handle of the improved implement with a hoe-blade and the tang thereof therewith, parts being in section to best illustrate the construction. Fig. 2 is a side view of a fragment of the handle of my improved implement with a hoe-blade and its tang in connection therewith, the part being shown as adjusted at a different angle from the angle at which the blade is set, as shown in Fig. 1. Fig. 3 is a view of the hoe-blade with its tang and a portion of the head of the shank of the handle in section on line 3 3 of Fig. 2.

In the drawings, 5 represents a fragment of a handle that may be employed with my improved implement. This handle is advisably constructed of wood. The handle is preferably provided with a head 6, which has a shank 7, preferably made hollow, and in which the end of the handle 5 is inserted and permanently secured. The head 6 is provided with a curved way or seat, the curved way being an arc of a circle having its axis at one side of the length of the handle and the length of the curved way being in the direction of the length of the handle. A means is provided in the head 6 for locking the tool in the head, and this may conveniently be a set-screw 8, turning through a boss or enlarged part 9 of the head 6 into the curved way for the tang. The curved way in the head 6 for the tang of the tool may be formed conveniently by a curved under surface of the head and transversely-perforated lugs or loops 10 10, located at a distance apart and near the extremities of the curved surface of the head, which lugs are preferably projected from the head 6 in the direction of radii of the curve of the under surface of the head. The perforations or apertures through the lugs are of a proper size to receive the tang of the tool therethrough and with the curved surface of the head form the way or seat for the tang of the tool.

The tool may be a hoe-blade 11, as shown in the drawings, a spade-blade, a rake-head, or other tool; but in every instance the tool is provided with an extended curved tang 12, having the same curve as the curved way in the head and fitting therein adjustably endwise and adapted to be clamped thereto by the binding means, such as the set-screw 8, as shown. The angle or position of the tang with reference to the blade or tool is to be fixed with reference to the form of the tool employed and the use to which it is to be put. The tool will, however, in all cases be removable from the handle, so as to be interchangeable with other tools having a similar tang construction, and also adjustable in the handle, especially with reference to the angle at which the tool shall be set to the handle and the distance at which the tool shall be located from the head of the handle.

What I claim as my invention is—

1. A garden implement, comprising a handle having a head provided with a curved seat extending in the direction of the length of the handle and the curve being that of an arc of a circle having its axis at one side of the head, a tool having a curved tang fitting adjustably endwise in the curved seat in the head, and means medially on the head adapted to engage the relatively adjustable tang for locking the tang releasably in the curved seat.

2. In a garden implement, a handle-heap having a curved under surface, a plurality of tang-holding members at a distance apart projecting from the head in front of the curved surface and as complementary thereto forming a seat for a longitudinally-curved tang of a tool, a tang-locking means between the tang-holding members, in combination with a tool having a curved tang fitted adjustably endwise in the curved seat on the head.

In testimony whereof I affix my signature in presence of two witnesses.

HANS HOLDEN JENSEN.

Witnesses:
C. T. BENEDICT,
C. H. KEENEY.